(12) United States Patent
Hao

(10) Patent No.: US 8,179,445 B2
(45) Date of Patent: May 15, 2012

(54) PROVIDING IMPROVED HIGH RESOLUTION IMAGE

(75) Inventor: Wei Hao, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 262 days.

(21) Appl. No.: 12/716,484

(22) Filed: Mar. 3, 2010

(65) Prior Publication Data
US 2011/0216210 A1 Sep. 8, 2011

(51) Int. Cl.
H04N 5/228 (2006.01)
G06K 9/32 (2006.01)

(52) U.S. Cl. .......... 348/208.13; 348/222.1; 382/299

(58) Field of Classification Search .......... 348/220.1, 348/208.13; 382/299, 300
See application file for complete search history.

(56) References Cited

U.S. PATENT DOCUMENTS

| 3,971,065 | A | 7/1976 | Bayer | |
|---|---|---|---|---|
| 5,506,619 | A | 4/1996 | Adams | |
| 562,973 | A | 5/1997 | Hamilton | |
| 5,652,621 | A | 7/1997 | Adams | |
| 7,239,342 | B2 | 7/2007 | Kingetsu | |
| 7,412,107 | B2* | 8/2008 | Milanfar et al. | 382/254 |
| 7,515,747 | B2* | 4/2009 | Okutomi et al. | 382/167 |
| 7,702,184 | B2* | 4/2010 | Aiso | 382/299 |
| 7,940,282 | B2* | 5/2011 | Milanfar et al. | 345/606 |
| 2002/0172434 | A1* | 11/2002 | Freeman et al. | 382/299 |
| 2006/0187308 | A1 | 8/2006 | Lim | |
| 2007/0024931 | A1 | 2/2007 | Compton | |
| 2009/0153694 | A1* | 6/2009 | Takayama | 348/222.1 |
| 2009/0232213 | A1* | 9/2009 | Jia | 375/240.16 |
| 2009/0238535 | A1* | 9/2009 | Robertson et al. | 386/37 |
| 2010/0007754 | A1* | 1/2010 | Doida | 348/222.1 |
| 2010/0026825 | A1* | 2/2010 | Doida | 348/222.1 |
| 2010/0026839 | A1 | 2/2010 | Border et al. | |
| 2010/0033602 | A1* | 2/2010 | Okada et al. | 348/241 |
| 2010/0150474 | A1* | 6/2010 | Aiso | 382/284 |
| 2011/0052095 | A1 | 3/2011 | Deever | |
| 2011/0142366 | A1* | 6/2011 | Young | 382/274 |
| 2011/0150331 | A1* | 6/2011 | Young | 382/167 |
| 2011/0211765 | A1* | 9/2011 | Nagumo et al. | 382/254 |

FOREIGN PATENT DOCUMENTS

| EP | 1 492 051 A2 | 12/2004 |
|---|---|---|
| EP | 2 059 027 A1 | 5/2009 |
| GB | 2 373 946 A | 10/2002 |
| JP | 2007006021 A * | 1/2007 |
| JP | 2009296285 A * | 12/2009 |

(Continued)

OTHER PUBLICATIONS

Farsiu et al.; "Dynamic Demosaicing and Color Super-Resolution of Video Sequences"; 2004; SPIE; vol. 5562; pp. 169-178.*

(Continued)

Primary Examiner — John Villecco
(74) Attorney, Agent, or Firm — Raymond L. Owens

(57) ABSTRACT

A method for producing an improved high resolution image is disclosed including capturing low resolution images and a high resolution image; combining the low resolution images to provide an aggregate low resolution image; reducing the resolution of the high resolution image and then interpolated to produce a blurred high resolution image; calculating an image difference map using the aggregate high resolution image and blurred high resolution image; and using the image difference map along with the aggregate high resolution image and the high resolution image to produce an improved high resolution image.

6 Claims, 8 Drawing Sheets

FOREIGN PATENT DOCUMENTS

WO   WO 2007142109 A1 * 12/2007

OTHER PUBLICATIONS

Farsiu et al.; "A Practical Approach to Super-Resolution"; 2006; Visual Communications and Image Processing, SPIE; vol. 6077.*

Min Kyu Park et al: "Super-Resolution Image Reconstruction: A Technical Overview", IEEE Signal Processing Magazine, IEEE Service Center, Piscataway, NJ, US, vol. 20, No. 3, May 1, 2003, pp. 21-36, XP011097476, ISSN: 1053-5888, DOI: DOI: 10.1109/MSP.2003.1203207, the whole document.

* cited by examiner

| R | G | R | G |
|---|---|---|---|
| G | B | G | B |
| R | G | R | G |
| G | B | G | B |

FIG. 2
*(Prior Art)*

PROVIDING IMPROVED HIGH RESOLUTION IMAGE

CROSS-REFERENCE

Reference is made to commonly assigned U.S. patent application Ser. No. 12/184,446 filed Aug. 1, 2008 entitled METHOD FOR FORMING AN IMPROVED IMAGE USING IMAGES WITH DIFFERENT RESOLUTIONS, by John N. Border, et al., and U.S. patent application Ser. No. 12/550,559 filed Aug. 31, 2009 entitled USING CAPTURED HIGH AND LOW RESOLUTION IMAGES, by Aaron T. Deever, the disclosures of which are incorporated herein.

FIELD OF THE INVENTION

The invention pertains to generating an improved image from multiple images. More specifically, multiple images are used to form a high resolution image having reduced motion blur and reduced noise.

BACKGROUND OF THE INVENTION

A problem to be addressed is light deficient photography in the presence of motion during image capture causing motion blur in the image. The motion can be of a global variety where the entire scene being imaged moves together or of a local variety where one or more portions of the scene move at a different speed or direction compared to the rest of the scene. Global motion is due to a relative motion between the scene and the camera during image capture. Local motion is due to objects within the scene moving relative to the other portions of the scene. Local motion can occur differently in different portions of the scene.

In the case where the exposure time is short and motion is slow, a single image capture can be used to capture an image with good image quality. However, as the exposure time required to get an image with a high signal-to-noise ratio becomes longer relative to the motion that is present during the image capture, or the available light decreases, captured image quality degrades in the form of increased motion blur and increased noise within the image.

For consumer digital cameras, there is a trend for the size of the pixels to get smaller over time, which decreases the available area to capture light during the exposure, so that noise becomes more of a problem. Exposure times are increased to compensate for smaller pixels, but then motion blur becomes more of a problem. Consequently, methods to increase the sensitivity of pixels to light have been described as in U.S. Patent Publication No. 2007/0024931 by Compton, et al, which adds panchromatic pixels to the image sensor.

As the motion increases relative to the exposure time or the available light decreases there are a series of compromises that are made. Several compromises are made in photographic space to increase spatial resolution, temporal resolution or image quality, but, it is important to note that with each gain there will also be losses. For instance, the exposure time is decreased to reduce motion blur thereby increasing temporal resolution, but at the expense of increasing noise in the image.

Flash is an effective way to reduce noise in the image and by enabling a shorter exposure time, the temporal resolution is increased but at the expense of uneven lighting and redeye. Additionally, there are image capture situations for which a flash is either not available or not beneficial.

Optically based image stabilization is used during the exposure to enable a longer exposure time to reduce noise in the image while decreasing motion blur and increasing spatial resolution. However, optically based image stabilization can only be used to reduce motion blur from camera motion (global motion). Additionally, optical image stabilization increases the cost and weight associated with the image capture device.

The effective size of the pixels is increased to enable a reduced exposure time by binning (i.e., adjacent pixels are connected to one another so the charge on the adjacent pixels is summed and the signal is increased). However, binning is accompanied by a decrease in spatial resolution.

Another method to reduce blur is to capture two high resolution images, one with a short exposure time, and one with a long exposure time. The short exposure time is selected so as to generate an image that is noisy, but relatively free of motion blur. The long exposure time is selected so as to generate an image that has little noise, but that can have significant motion blur. Image processing algorithms are used to combine the two captures into one final output image. Such approaches are described in U.S. Pat. No. 7,239,342, U.S. Patent Publication No. 2006/0017837, U.S. Patent Publication 2006/0187308 and U.S. Patent Application Publication 2007/0223831. The drawbacks of these approaches include a requirement for additional buffer memory to store multiple high resolution images, additional complexity to process multiple high resolution images and potential gaps in time between the two image captures.

Another method to reduce blur is through image restoration—de-blurring—algorithms applied post-capture. An example of such an approach is the well-known Lucy-Richardson de-convolution algorithm. Drawbacks of this and similar approaches include high computational complexity and sensitivity to noise.

Multiple low resolution video images can be used to form a single image with improved image quality while maintaining spatial resolution and offering a balance between temporal resolution and exposure time. Reading multiple images within a given time can reduce motion blur by using a shorter exposure time for each image, however, each image will be noisier. By aligning the multiple images with each other to correct for motion between individual image captures and then summing the individual images together, the noise is reduced in the formed single image.

While multiple low resolution video images are read out relatively quickly (30-60 images/sec is typical), and the images typically have lower noise since the pixels are often binned, the single image that is formed is limited to relatively low resolution. Conversely, multiple high resolution images are used to form a high resolution single image. However, high resolution images typically are noisier since the pixels are smaller and more significantly, a relatively large amount of time is required to readout multiple high resolution images (1.5-7 images/sec is typical) due to hardware limitations. In addition, the problem of aligning the images grows large due to significant motion between the image captures.

Therefore, a need in the art exists for an improved solution to combining multiple images to form an improved image, especially in scenes where motion is present.

SUMMARY OF THE INVENTION

The object of this invention is to produce an improved high resolution image using low resolution images and at least one high resolution image. The object is achieved by a method for using low resolution images and at least one high resolution image of a scene captured by the same image capture device to provide an improved high resolution image, comprising:

a) using the image capture device to capture a plurality of low resolution images of the scene and at least one high resolution image of the scene having a resolution greater than that of the low resolution images;

b) combining the low resolution images to provide an aggregate low resolution image; and c) combining the high resolution image with the aggregate low resolution image to provide the improved high resolution image by:

i) interpolating the aggregate low resolution image to provide an aggregate high resolution image;

ii) reducing the resolution of the high resolution image to provide a representative low resolution image that could have been captured by the image capture device;

iii) interpolating the representative low resolution image to produce a blurred high resolution image iv) calculating an image difference map from the aggregate high resolution image and the blurred high resolution image; and v) using the image difference map along with the aggregate high resolution image and the high resolution image to produce an improved high resolution image.

An advantage of the present invention is that an improved high resolution image is produced with basic changes to the image processing software without having to use a photographic flash or long exposure times to properly expose a single image.

A further advantage of the present invention is that an improved high resolution image is produced without the need for costly special lenses with laterally moveable lens elements.

A further advantage of the present invention is that an improved high resolution image is produced without increased buffer memory requirements for storing multiple high resolution images.

A further advantage of the present invention is that an improved high resolution image is produced without the need for computationally complex de-blurring algorithms.

A still further advantage of the present invention is that it can produce a high resolution image having reduced motion blur and reduced noise.

This and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 2 (prior art) is a view of a Bayer color filter array pattern for a portion of an image sensor;

DETAILED DESCRIPTION OF THE INVENTION

Because digital cameras employing imaging devices and related circuitry for signal capture and correction and for exposure control are well known, the present description will be directed in particular to elements forming part of, or cooperating more directly with, method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
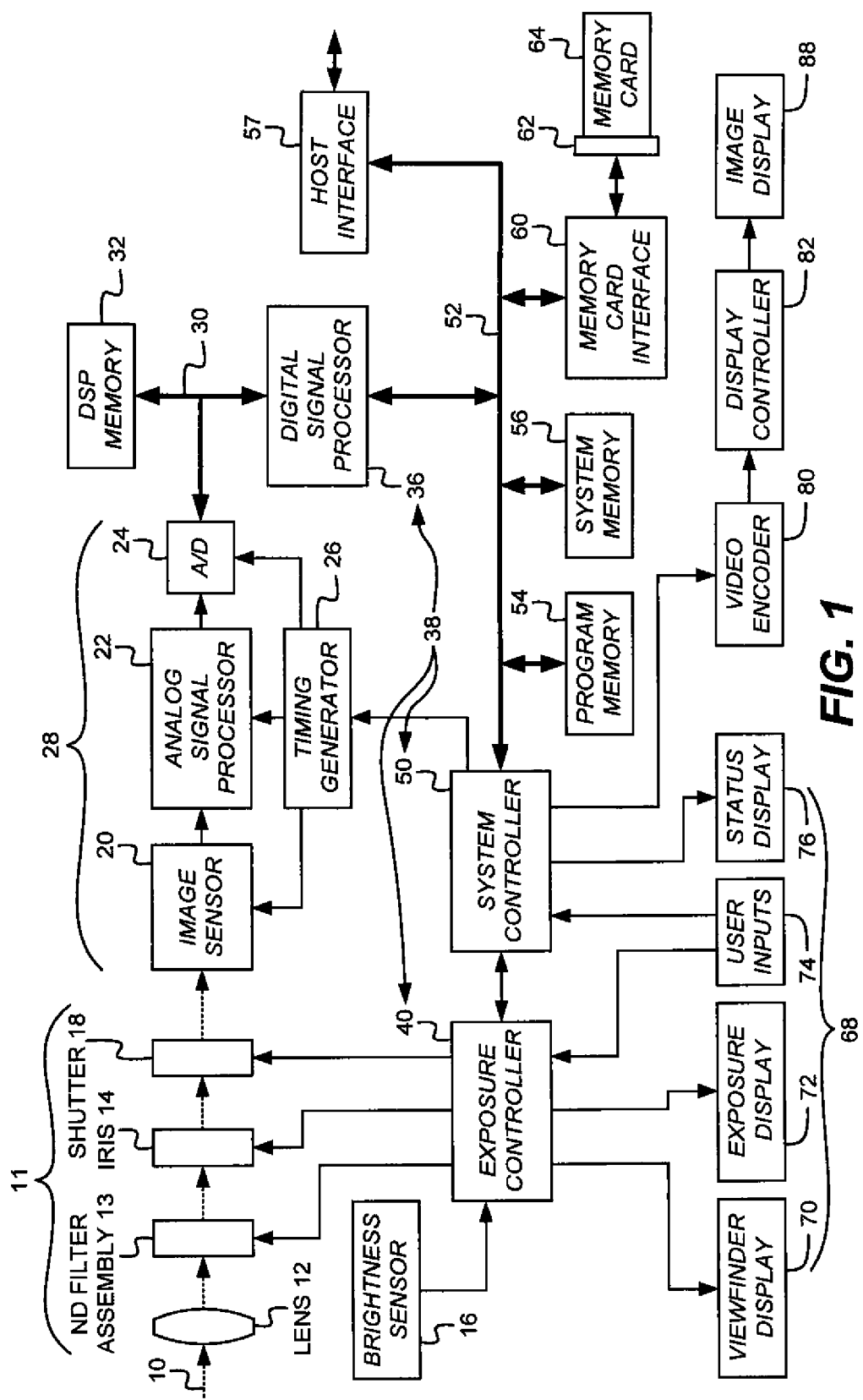
FIG. 1 is a block diagram of a conventional digital still camera system that can employ a conventional sensor and processing methods or the sensor and processing methods of the current invention.

Turning now to FIG. 1, a block diagram of an image capture device shown as a digital camera embodying the present invention is shown. Although a digital camera will now be explained, the present invention is clearly applicable to other types of image capture devices, such as imaging sub-systems included in non-camera devices such as mobile phones and automotive vehicles, for example. Light 10 from the subject scene is input to an imaging stage 11, where the light is focused by lens 12 to form an image on solid-state image sensor 20. Image sensor 20 converts the incident light to an electrical signal by integrating charge for each picture element (pixel). The image sensor 20 of the preferred embodiment is a charge coupled device (CCD) type or an active pixel sensor (APS) type. (APS devices are often referred to as CMOS sensors because of the ability to fabricate them in a Complementary Metal Oxide Semiconductor process). The sensor 20 includes an arrangement of color filters, as subsequently described in more detail.

The amount of light reaching the sensor 20 is regulated by an iris block 14 that varies the aperture and the neutral density (ND) filter block 13 that includes one or more ND filters interposed in the optical path. Also regulating the overall light level is the time that the shutter block 18 is open. The exposure controller block 40 responds to the amount of light available in the scene as metered by the brightness sensor block 16 and controls all three of these regulating functions.

The analog signal from image sensor 20 is processed by analog signal processor 22 and applied to analog to digital (A/D) converter 24 for digitizing the sensor signals. Timing generator 26 produces various clocking signals to select rows and pixels and synchronizes the operation of analog signal processor 22 and A/D converter 24. The image sensor stage 28 includes the image sensor 20, the analog signal processor 22, the A/D converter 24, and the timing generator 26. The functional elements of image sensor stage 28 are separately fabricated integrated circuits, or they are fabricated as a single integrated circuit as is commonly done with CMOS image sensors. The resulting stream of digital pixel values from A/D converter 24 is stored in memory 32 associated with digital signal processor (DSP) 36.

Digital signal processor 36 is one of three processors or controllers in this embodiment, in addition to system controller 50 and exposure controller 40. Although this distribution of camera functional control among multiple controllers and processors is typical, these controllers or processors are combined in various ways without affecting the functional operation of the camera and the application of the present invention. These controllers or processors can include one or more digital signal processor devices, microcontrollers, programmable logic devices, or other digital logic circuits. Although a combination of such controllers or processors has been described, it should be apparent that one controller or processor is designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. DSP 36 executes the software needed for practicing image processing shown in FIG. 1. Memory 32 includes any type of random access memory, such as SDRAM. A bus 30 comprising a pathway for address and data signals connects DSP 36 to its related memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter 13, iris 14, and shutter 18 as previously described, directing the timing generator 26 to operate the image sensor 20 and associated elements, and directing DSP 36 to process the captured image data. After an image is captured and processed, the final image file stored in memory 32 is transferred to a host computer via host interface 57, stored on a removable memory card 64 or other storage device, and displayed for the user on image display 88.

A bus 52 includes a pathway for address, data and control signals, and connects system controller 50 to DSP 36, program memory 54, system memory 56, host interface 57, memory card interface 60 and other related devices. Host interface 57 provides a high-speed connection to a personal computer (PC) or other host computer for transfer of image data for display, storage, manipulation or printing. This interface is an IEEE1394 or USB2.0 serial interface or any other suitable digital interface. Memory card 64 is typically a Compact Flash (CF) card inserted into socket 62 and connected to the system controller 50 via memory card interface 60. Other types of storage that are used include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

The user interface 68, including all or any combination of viewfinder display 70, exposure display 72, status display 76 and image display 88, and user inputs 74, is controlled by a combination of software programs executed on exposure controller 40 and system controller 50. User inputs 74 typically include some combination of buttons, rocker switches, joysticks, rotary dials or touch screens. Exposure controller 40 operates light metering, exposure mode, autofocus and other exposure functions. The system controller 50 manages the graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture, the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. Because of this flexibility, digital still cameras can have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that can be selected to reduce the cost, add features, or improve the performance of the camera. For example, an autofocus system is added, or the lens is detachable and interchangeable. It will be understood that the present invention is applied to any type of digital camera or, more generally, digital image capture apparatus, where alternative modules provide similar functionality.

Given the illustrative example of FIG. 1, the following description will then describe in detail the operation of this camera for capturing images according to the present invention. Whenever general reference is made to an image sensor in the following description, it is understood to be representative of the image sensor 20 from FIG. 1. Image sensor 20 shown in FIG. 1 typically includes a two-dimensional array of light sensitive pixels fabricated on a silicon substrate that convert incoming light at each pixel into an electrical signal that is measured. In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values. The term color pixel will refer to a pixel having a color photoresponse over a relatively narrow spectral band. The terms exposure duration and exposure time are used interchangeably.

As sensor 20 is exposed to light, free electrons are generated and captured within the electronic structure at each pixel. Capturing these free electrons for some period of time and then measuring the number of electrons captured, or measuring the rate at which free electrons are generated, can measure the light level at each pixel. In the former case, accumulated charge is shifted out of the array of pixels to a charge-to-voltage measurement circuit as in a charge-coupled device (CCD), or the area close to each pixel can contain elements of a charge-to-voltage measurement circuit as in an active pixel sensor (APS or CMOS sensor).

Figure 2:
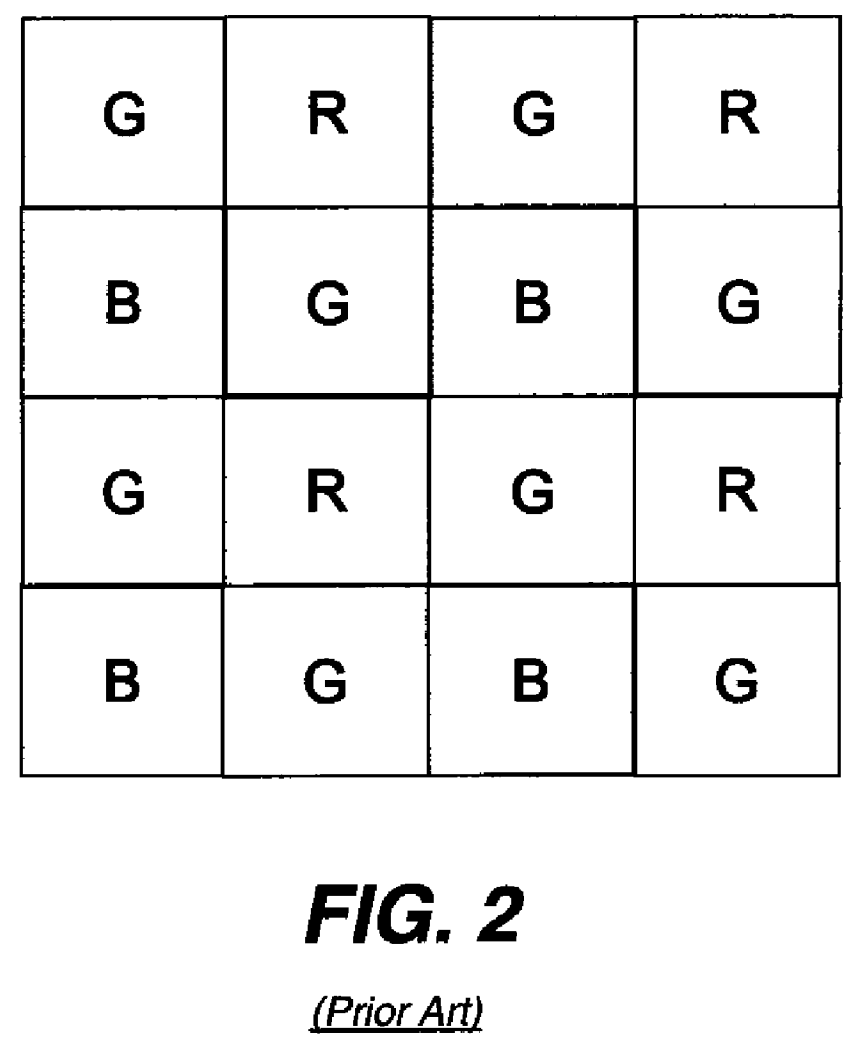

In order to produce a color image, the array of pixels in an image sensor typically has a pattern of color filters placed over them. FIG. 2 shows a pattern of red (R), green (G), and blue (B) color filters that is commonly used. This particular pattern is commonly known as a Bayer color filter array (CFA) after its inventor Bryce Bayer as disclosed in U.S. Pat. No. 3,971,065. This pattern is effectively used in image sensors having a two-dimensional array of color pixels. As a result, each pixel has a particular color photoresponse that, in this case, is a predominant sensitivity to red, green or blue light. Another useful variety of color photoresponses is a predominant sensitivity to magenta, yellow, or cyan light. In each case, the particular color photoresponse has high sensitivity to certain portions of the visible spectrum, while simultaneously having low sensitivity to other portions of the visible spectrum.

An image captured using an image sensor having a two-dimensional array with the CFA of FIG. 2 has only one color value at each pixel. In order to produce a full color image, there are a number of techniques for inferring or interpolating the missing colors at each pixel. These CFA interpolation techniques are well known in the art and reference is made to the following patents: U.S. Pat. No. 5,506,619; U.S. Pat. No. 5,629,734; and U.S. Pat. No. 5,652,621.

One drawback of the CFA pattern illustrated in FIG. 2 is that much of the light incident on a given pixel is filtered out, resulting in noisy images in low-light conditions. One type of solution to improve low-light imaging is the use of some portion of sensor array pixels as panchromatic pixels. For example, commonly assigned U.S. Patent Application No. 2007/0024931 entitled "Image Sensor with Improved Light Sensitivity" by Compton et al. discloses an image sensor having both color and panchromatic pixels. In the context of the present disclosure, the term panchromatic pixel refers to a pixel having a generally panchromatic photo-response, with a wider spectral sensitivity than the narrower spectral sensitivities represented in the selected set of color photo-responses. That is, a panchromatic pixel can have high sensitivity to light across the entire visible spectrum. Although the panchromatic pixels generally have a wider spectral sensitivity than the set of color photo-responses, each panchromatic pixel can also have an associated filter. Such filter can be either a neutral density filter or a color or bandwidth filter.

Figure 3:
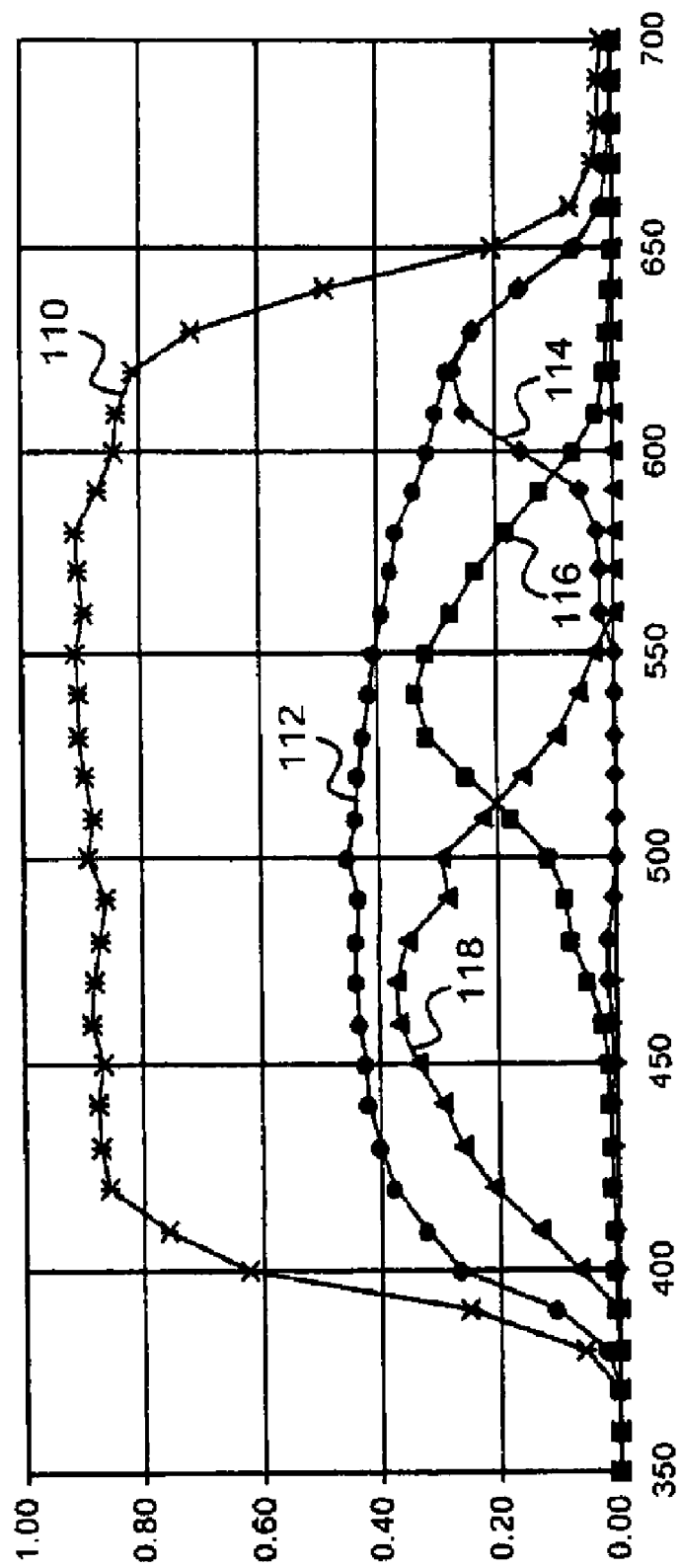
FIG. 3 (prior art) provides representative spectral quantum efficiency curves for red, green, and blue pixels, as well as a wider spectrum panchromatic quantum efficiency, all multiplied by the transmission characteristics of an infrared cut filter.

Referring to the graph of FIG. 3, there are shown the relative spectral sensitivities of pixels with red, green, and blue color filters in a typical camera application. The X-axis in FIG. 3 represents light wavelength in nanometers, spanning wavelengths approximately from the near ultraviolet to near infrared, and the Y-axis represents efficiency (normalized). In FIG. 3, curve 110 represents the spectral transmission characteristic of a typical bandwidth filter used to block infrared and ultraviolet light from reaching the image sensor. Such a filter is needed because the color filters used for image sensors typically do not block infrared light, hence the pixels can be unable to distinguish between infrared light and light that is within the pass bands of their associated color filters. The infrared blocking characteristic shown by curve 110 thus prevents infrared light from corrupting the visible light signal. The spectral quantum efficiency, i.e. the proportion of incident photons that are captured and converted into a measurable electrical signal, for a typical silicon sensor with red, green, and blue filters applied is multiplied by the spectral transmission characteristic of the infrared blocking filter represented by curve 110 to produce the combined system quantum efficiencies represented by curve 114 for red, curve 116 for green, and curve 118 for blue. It is understood from these curves that each color photo-response is sensitive to only a portion of the visible spectrum. By contrast, the photo-response of the same silicon sensor that does not have color filters applied (but including the infrared blocking filter characteristic) is shown by curve 112; this is an example of a panchromatic photo-response. By comparing the color photo-response curves 114, 116, and 118 to the panchromatic photo-response curve 112, it is clear that the panchromatic photo-response can be three to four times more sensitive to wide spectrum light than any of the color photo-responses.

Figure 4:
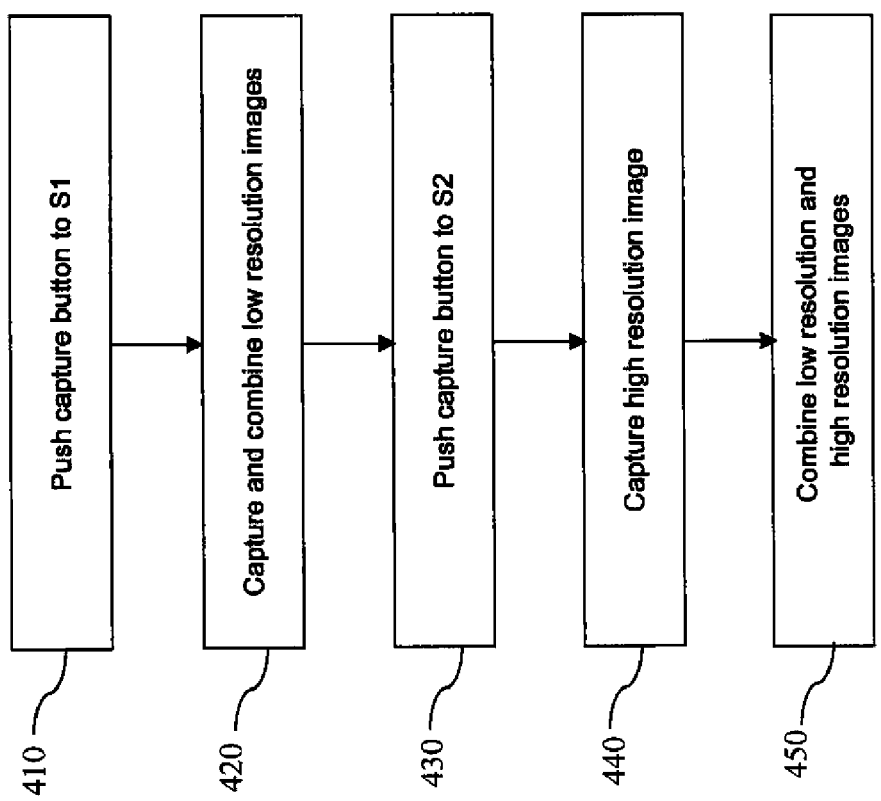
FIG. 4 is a flow diagram showing an embodiment of the current invention.

FIG. 4 illustrates a flow diagram according to an embodiment of the present invention. In step 410, the operator begins the acquisition process by pushing the capture button on the camera from the S0 position (undepressed position) to the S1 position (partially depressed position) thereby sending a partially-depressed-capture-button signal to the system controller 50 in the camera, as the operator composes the image. The system controller 50 then instructs the camera to begin acquiring and combining multiple low resolution images 420, using available DSP memory 32. It should be noted that at the same time, the system controller 50 in the camera would also typically complete autofocus and autoexposure. When the moment of acquisition is identified by the operator, the operator pushes the capture button from S1 to S2 (fully depressed position) thereby sending a fully-depressed-capture button signal to the system controller 50 in the camera, as shown in Step 430. At this point, in Step 440, the system controller 50 instructs the camera to stop continuous acquisition or capture of the low resolution images and to initiate the acquisition of a high resolution image. Finally, in Step 450 the low and high resolution images are combined to form an improved high resolution image. The collection of all captured low and high resolution images is referred to as a capture set.

The low resolution images captured in Step 420 can be preview images, such as often displayed on the camera LCD display 88. Such images are typically captured and displayed at 30 frames per second at a spatial resolution of 320 columns by 240 rows, or at VGA resolution (640 columns by 480 rows). This spatial resolution is not limiting, however, and the low resolution images can be captured at a greater spatial resolution. The frequency at which the low resolution images can be captured and read out from the sensor is inversely proportional to the spatial resolution of the low resolution images.

The high resolution image captured in Step 440 is of greater spatial resolution than the low resolution images captured during Step 420. Often the high resolution image has the full spatial resolution of the image sensor 20.

The capture of low resolution images can also occur outside of S1. While the camera is in the S0 position, low resolution images can be captured and combined as in Step 420. The capture of low resolution images can also continue through a transition from S0 to S1, or through a transition from S1 to S0.

An example of a capture set is as follows for a 10 megapixel digital camera. When the operator pushes the capture button from S0 to S1, the system controller 50 instructs the camera to begin acquiring and combining low resolution images continuously. The low resolution images are 9× binned—a factor of 3 both horizontally and vertically—so that the resolution of each low resolution image is approximately 1 megapixel. The low resolution images are acquired at 30 images per second. Depending on the light level present in the scene, the low resolution images can be acquired with an exposure time of 1/30 second each or less. The images are combined as they are captured, such that only two images are stored in memory—the current image and the aggregate (combined) image. When the capture button is pressed to S2, a single high resolution image is captured. The high resolution image can be acquired at the full sensor resolution of 10 megapixels. The exposure time for the high resolution image can be shorter, longer, or substantially the same as the exposure time for the low resolution images, depending on the light level present in the scene as well as depending on any motion of the camera and scene. The capture set at the completion of capture comprises a single aggregate 1 megapixel image as well as a single 10 megapixel image.

Figure 5:
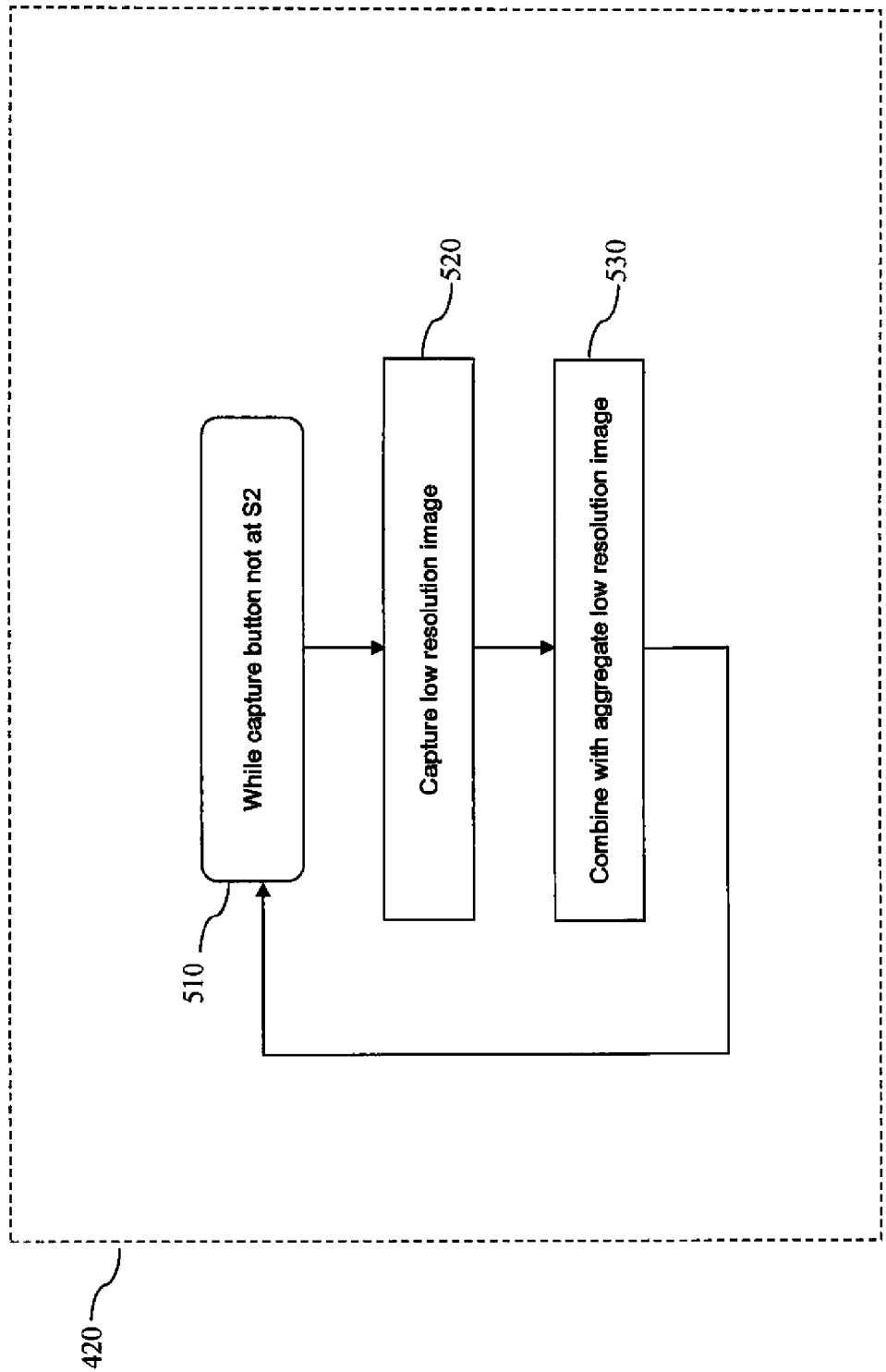
FIG. 5 is a flow diagram illustrating the formation of an aggregate low resolution image.

FIG. 5 describes in more detail the step of capturing and combining low resolution images 420 from FIG. 4. After the operator presses the capture button to the S1 position, the capturing and combining of low resolution images takes place continuously until the capture button is pressed to S2 510. An individual low resolution image is captured 520, and subsequently combined with the aggregate low resolution image 530. In a preferred embodiment, the low resolution images are combined into an aggregate low resolution image using an infinite impulse response filter. Infinite impulse response filters are well-known to those skilled in the art. In the context of this disclosure, an infinite impulse response filter has the property that the filtered value (the aggregate low resolution image) at any instant is a weighted combination of the current and previous low resolution images in which the weight for each low resolution is strictly positive. Specifically, the relationship between the captured low resolution images and aggregate low resolution image is given by the following formula:

$$A[1]=C[1]$$

$$A[n]=(1-\alpha)A[n-1]+\alpha C[n] \text{ for } n>1.$$

In this formula, A represents the aggregate low resolution image. C represents a captured low resolution image, and the number, n, in brackets represents that the associated image corresponds to the nth captured low resolution image. Thus the aggregate low resolution image is initially set equal to the first captured low resolution image. Subsequently, the aggregate low resolution image is updated to equal a weighted combination of the current captured low resolution image and the previous aggregate low resolution image. The parameter $\alpha$ controls the relative importance of the current captured frame. The parameter $\alpha$ is restricted to the range (0,1), with a preferred value of 0.25.

This capture and combine approach requires storage for only two low resolution images at any time—the current captured low resolution image and the aggregate low resolution image. Once a low resolution image has been combined with the aggregate low resolution image, it can be discarded (or used for example only additionally for autofocus and autoexposure and then discarded).

The current captured low resolution image can also be aligned with the aggregate low resolution image before combination. Specifically, a step of motion estimation and compensation can be included to align the captured low resolution image and the aggregate low resolution image. This motion estimation and compensation step can account for global camera motion and additionally local motion as well. Techniques for global and local motion estimation and compensation are various and well-known to those skilled in the art.

In a preferred embodiment, the captured low resolution images remain CFA images when they are combined, and the aggregate low resolution image is a CFA image as well. Alternatively, the captured low resolution images are color interpolated to generate full color low resolution images, and the aggregate low resolution image is a full color image as well.

The described approach to combining low resolution images has the advantage that it achieves the noise reduction benefits of averaging many low resolution images without having to simultaneously store them. Additionally, by weighting more recent captured images more heavily, the aggregate low resolution image favors the most recent status of the scene. Compared to an evenly weighted average of low resolution images, the weighted aggregate is more likely to match with the subsequently captured high resolution image. Additionally, an cc equal to 0.25 allows computationally efficient combination of the current and aggregate low resolution images, requiring only simple add and shift operations, as opposed to more complex multiply or divide operations. Similarly, an $\alpha$ equal to 0.5 can be used to place additional emphasis on more recent images, while still requiring only add and shift operations.

Figure 6:
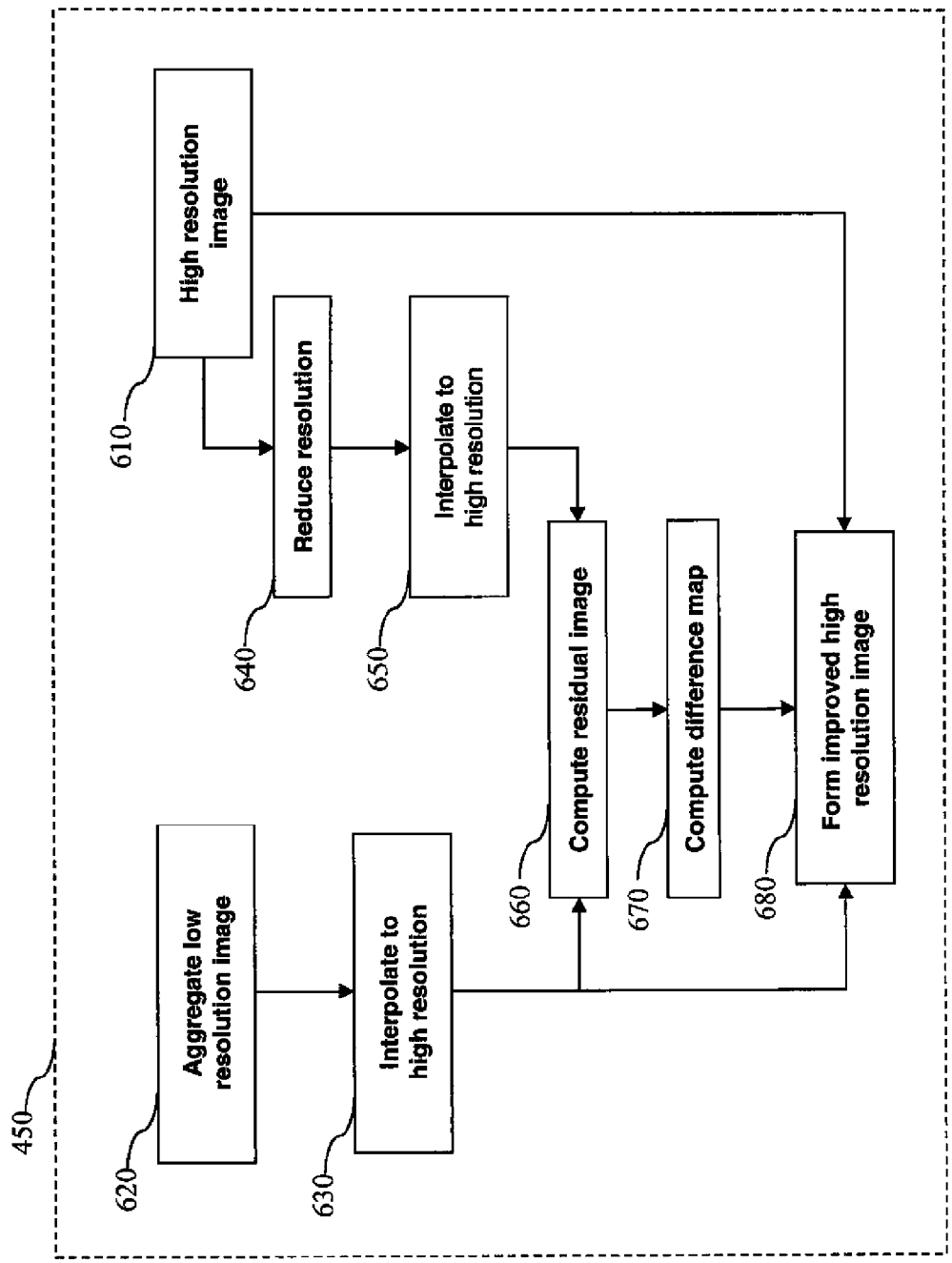
FIG. 6 is a flow diagram illustrating the formation of an improved high resolution image from a high resolution image and an aggregate low resolution image.

FIG. 6 describes in more detail the step of combining the low resolution and high resolution images 450 from FIG. 4. After the operator pushes the capture button to S2 430, a high resolution image is captured 440. Thus the step of combining the low and high resolution images begins with a high resolution image 610 and an aggregate low resolution image 620. The aggregate low resolution image is interpolated to high resolution 630. This step produces an aggregate high resolution image that has the resolution of the high resolution image. In a preferred embodiment, bicubic interpolation is used to generate the aggregate high resolution image. Those skilled in the art will recognize, however, that there exist many suitable interpolation techniques to generate an interpolated high resolution image.

In step 640, the high resolution image 610 is reduced in resolution 640. This step can comprise pixel combining, decimation or cropping. In a preferred embodiment, the step of reducing the resolution of the high resolution image is designed to mimic the steps used by the digital capture device, such as a digital camera, to generate the low resolution images. This step produces a representative low resolution image that could have been captured by the image capture device.

In step 650, the representative low resolution image is then interpolated to high resolution 650, using the same method as in step 630. This step produces a blurred high resolution image. Similar to step 630, in a preferred embodiment, bicubic interpolation is used to generate the blurred high resolution image. Those skilled in the art will recognize, however, that there exist many suitable interpolation techniques to generate an interpolated high resolution image.

In step 660, the difference between the blurred high resolution image and the aggregate high resolution image is calculated. This step produces a residual image, R.

In step 670, the residual image is converted to an image difference map. For each pixel location (x,y), this map is calculated by comparing the magnitude of the residual to the expected noise standard deviation for the blurred high resolution image, as in the following equation:

$$t(x, y) = \frac{|R(x, y)|}{\sigma_{B(x,y)}}.$$

In this equation, the difference map is given by t, the residual is given by R, and the noise standard deviation corresponding to a pixel from the blurred high resolution image is given by $\sigma_{B(x,y)}$.

The difference map is then transferred to the range [0,1] by the following equation:

$$\alpha = \frac{1 - e^{-t}}{1 + e^{-t}}.$$

The difference map, α, ranges from 0 to 1 with "0" representing complete match and "1" representing complete mismatch between the aggregate high resolution image and the blurred high resolution image. This map can be used to identify mismatched pixels due to motion in the scene during capture.

In step 680, the image difference map is used along with the high resolution image and the aggregate high resolution image to form an improved high resolution image.

Figure 7:
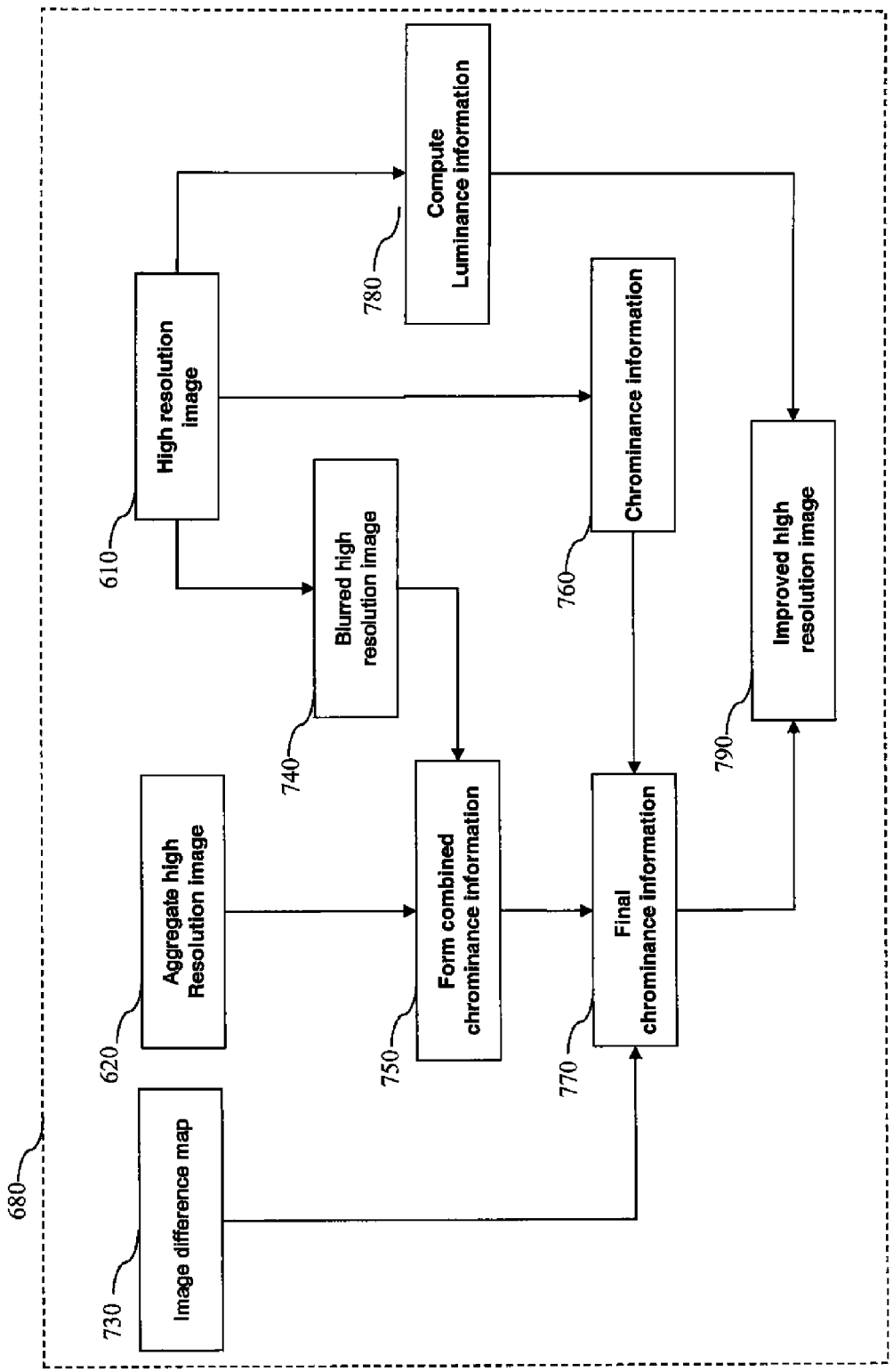
FIG. 7 is a flow diagram illustrating one of the algorithms to combine the aggregate high resolution image with the high resolution image, using an image difference map.

FIG. 7 describes one of the methods for step 680 in FIG. 6, where the high resolution image 610 and the aggregate high resolution image 620 are combined using the image difference map 730.

In step 740, a blurred high resolution image is produced. Similar to step 640 and 650, the high resolution image is reduced in resolution. This step can comprise pixel combining, decimation or cropping. In a preferred embodiment, the step of reducing the resolution of the high resolution image is designed to mimic the steps used by the digital capture device, such as a digital camera, to generate the low resolution images. This step produces a reduced image that could have been captured by the image capture device. The reduced image is then interpolated to produce the blurred high resolution image.

Then the chrominance information from the blurred high resolution image is combined with the chrominance information from the aggregate high resolution image to form combined chrominance information 750. This is done according to the following equation:

$$C_C = \frac{\sigma_A}{\sigma_A + \sigma_B} C_B + \frac{\sigma_B}{\sigma_A + \sigma_B} C_A.$$

In this equation, $C_C$ is the combined chrominance value, $C_B$ is the chrominance value from the blurred high resolution image, and $C_A$ is the chrominance value from the aggregate high resolution image. $\sigma_B$ is the standard deviation of the noise associated with the blurred high resolution image pixel value, and $\sigma_A$ is the standard deviation of the noise associated with the aggregate high resolution image pixel value.

To avoid introducing artifacts caused by motion occurring during the capture, the final chrominance information 770 is computed as a weighted average of the high resolution image chrominance information 760 and the combined chrominance information 750. At each pixel, the final chrominance information, $C_F$, can be calculated by the following equation:

$$C_F = \alpha C_C + (1-\alpha) C_H$$

In this equation, $C_H$ is the high resolution chrominance information 760, and α is the value from image difference map 730. Next, luminance information is computed from the high resolution image 780. The luminance information is combined with the final chrominance information 770 to form the improved high resolution image 790.

Figure 8:
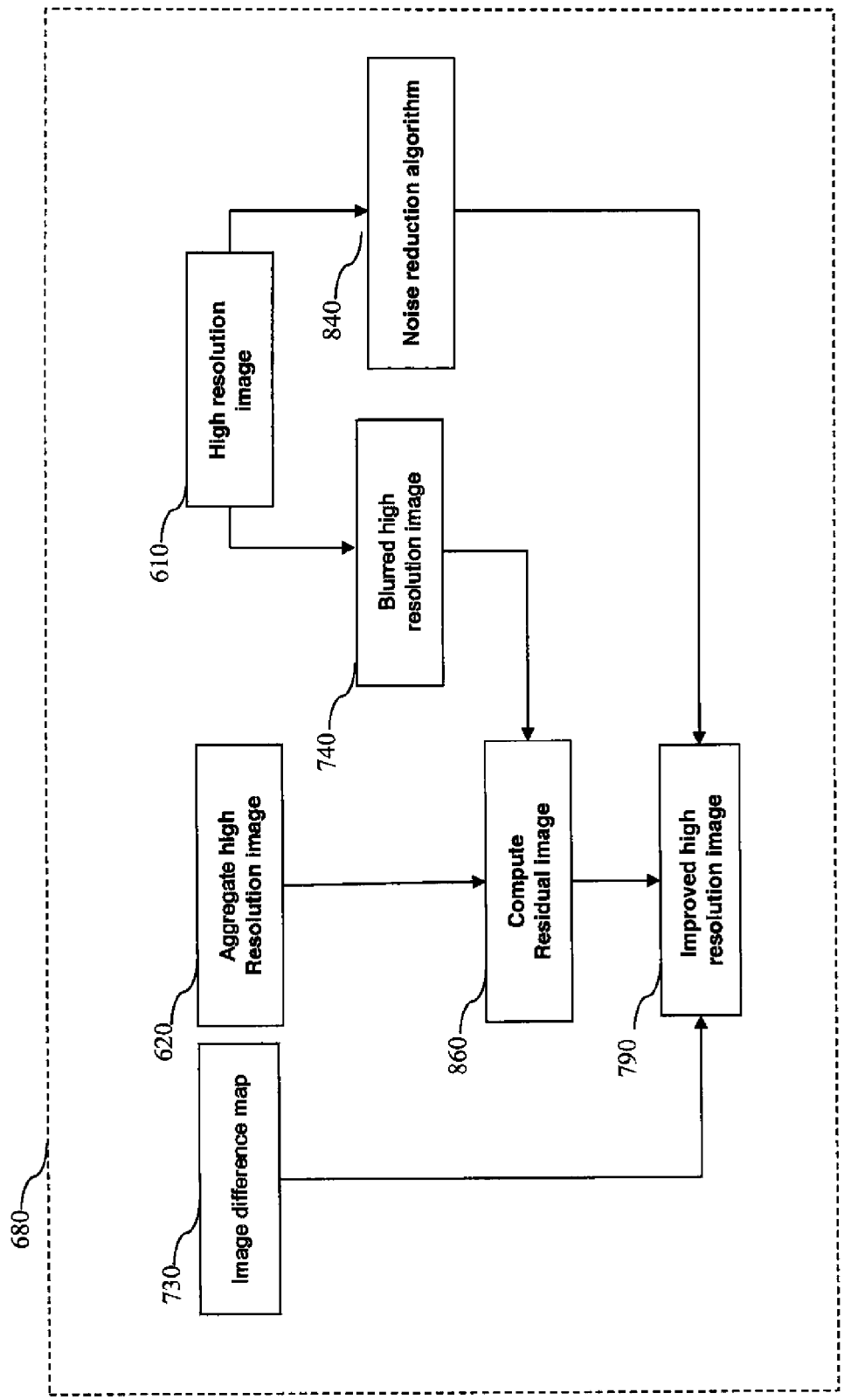
FIG. 8 is a flow diagram illustrating another algorithm to combine the aggregate high resolution image with the high resolution image, using the image difference map.

FIG. 8 describes another method for step 680 in FIG. 6, where the high resolution image 610 and the aggregate high resolution image 620 are combined using the image difference map 730. This method corresponds to the scenario in which the high resolution image has been processed by a noise reduction algorithm 840, which produces a noise-reduced high resolution image. First the blurred high resolution image 740 is produced. The blurred high resolution image can be recomputed as in step 640 and 650, or it can be retained in memory from the previous calculation in steps 640 and 650. In step 860, the difference between the blurred high resolution image and the aggregate high resolution image is calculated. This step produced a residual image.

In step 840, a noise reduction algorithm is applied to the high resolution image. It can be any existing noise reduction techniques depend on the noise situation in high resolution image. This step produces a noise-reduced high resolution image.

Finally the residual image is combined with the noise-reduced high resolution image to form an improved high resolution image 790. The residual image and noise-reduced high resolution image are combined using the following equation:

$$I_F = I_C + (1-\alpha) I_R,$$

In this equation $I_R$ is the residual image, $I_C$ is the noise-reduced high resolution image and α is the value from image difference map 730.

The invention provides several advantageous elements for producing an improved high resolution image. Compared to algorithms that use multiple high resolution images to produce an improved high resolution image, the use of low resolution images provides minimal delay between capture of the low resolution images and capture of the high resolution image, thus minimizing the effect of motion occurring during the capture process. Additionally, the use of low resolution images focuses the improvement on the low frequency noise in the high resolution image. Low frequency noise—color blobs—is often considered the most bothersome, objectionable and difficult noise to clean in an image, and the low resolution images specifically provide improvement for low frequency noise.

Another advantageous feature of the invention is that it can be implemented with low memory and computational costs, and the output can be fed directly back into the standard image processing chain. The low resolution images can be retained as CFA pattern images, and the improved high resolution image can be an improved CFA pattern image. This improved high resolution image can subsequently be input directly back into the image processing path.

The invention is particularly useful for a low-light imaging scenario. In such a case, it can normally be appropriate to have a long exposure to collect enough light to achieve an acceptable signal-to-noise ratio. Such a long exposure, however, can result in a blurred image caused by camera shake during the exposure. Low resolution images can be used to provide an improved signal-to-noise position, and thus reduce the required exposure time for the high resolution image, thereby reducing the motion blur and providing a way for image stabilization.

The invention can also be used in conjunction with motion information provided from a device such a gyroscope or accelerometer. Gyroscopic measurements taken during a high resolution capture can indicate if there is significant camera movement occurring during the capture, and if so, the capture is terminated prematurely, and low resolution images captured previously (or subsequently) are used to improve the signal-to-noise position, while simultaneously allowing a high resolution image with reduced motion blur.

Gyroscopic measurements available before capture are used to assess the current and expected movement of the camera during a capture, and are used to set the high resolution exposure accordingly. If the high resolution exposure is shortened below a desired exposure time, the signal is supplemented with information from low resolution captures.

A system controller 50 can choose to always shorten the high resolution exposure from the initially calculated target exposure, and compensate for lost signal with low resolution images.

Another use of the invention can occur post-capture. The amount of analog and digital gain applied to the high resolution image is analyzed, and if the gain factor is too high, the noise position of the high resolution image can be improved by using the low resolution images.

Another use of the invention is to capture high resolution images initially and digitally combine them to form low resolution images. These low resolution images can then be combined with a final captured high resolution image. In this scenario, since multiple high resolution images are read from the sensor, there is no advantage for fast readout of binned images. The high resolution images are combined into a single aggregate low resolution image, however, such that memory costs remain small. The aggregate low resolution image improves the signal-to-noise ratio in the low frequencies of the high resolution image. Noise in the low frequencies of an image is typically difficult to clean and also visually objectionable.

The frame rate, resolution, and exposure for each low resolution image is chosen based on capture conditions and camera capabilities. In a preferred embodiment, the resolution of the low resolution images is approximately one-third the resolution of the high resolution image in each dimension. This amount of resolution reduction allows the low resolution images to improve the signal-to-noise in the low frequencies of the high resolution image. It also allows the high resolution image to retain its original high frequencies, which prevents the introduction of visual artifacts that often occurs when trying to combine multiple images of equal spatial resolution and some scene content difference due to motion within the scene. In a preferred embodiment, the low resolution images are captured at 30 images per second, or at the maximum rate of the camera if it is lower than 30 images per second for images of the desired resolution. In a preferred embodiment, the exposure of each low resolution image is equal to the inverse of the rate of the camera. That is, if the camera can capture 30 low resolution images per second, the exposure of each low resolution image is $1/30$ second. Additionally, in a preferred embodiment, no pixels are discarded during the binning process. For example, for a binning factor of 3× in each dimension, this results in 9 pixels being combined to form each binned pixel value. In the case that the scene being imaged has sufficient light, such that the described exposure and binning settings result in overexposure and saturation, the low resolution images can be altered by either reducing the exposure of each image or by discarding some pixel data during the binning process.

Those skilled in the art will recognize that there are many alternative methods to the present invention.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST

10 Light
11 Imaging stage
12 Lens
13 Filter block
14 Iris
16 Sensor block
18 Shutter block
20 Image Sensor
22 Analog signal processor
24 A/D converter
26 Timing generator
28 Sensor stage
30 Bus
32 Memory
36 Digital signal processor
38 Processing Stage
40 Exposure controller
50 System controller
52 Bus
54 Program memory
56 System memory
57 Host interface
60 Memory card interface
62 Socket
64 Memory card
68 User interface
70 Viewfinder display
72 Exposure display
74 User inputs 76 Status display
80 Video encoder
82 Display controller
88 Image display
110 Filter transmission curve
112 Panchromatic photo-response curve
114 Color photo-response curve
116 Color photo-response curve
118 Color photo-response Curve
410 Capture button to S1 block
420 Image acquisition and combination block
430 Capture button to S2 block
440 Image acquisition block
450 Image combination block
510 Capture button query
520 Image acquisition block
530 Image combination block
610 High resolution image
620 Aggregate low resolution image
630 Interpolation block
640 Resolution reduction block
650 Interpolation block
660 Residual computation block
670 Image difference map computation block
680 Image combination block
730 Image difference map
740 Compute blurred high resolution image block
750 Combined chrominance information formation block
760 Chrominance information from high resolution image
770 Final chrominance information combination block
780 Luminance information from the high resolution image
790 Improved high resolution image formation block
840 Noise reduction block
860 Residual computation block

The invention claimed is:

1. A method for using low resolution images and at least one high resolution image of a scene captured by the same image capture device to provide an improved high resolution image, comprising:
   a) using the image capture device to capture a plurality of low resolution images of the scene and at least one high resolution image of the scene having a resolution greater than that of the low resolution images;
   b) combining the low resolution images to provide an aggregate low resolution image; and
   c) combining the high resolution image with the aggregate low resolution image to provide the improved high resolution image by:
      i) interpolating the aggregate low resolution image to provide an aggregate high resolution image;
      ii) reducing the resolution of the high resolution image to provide a representative low resolution image that could have been captured by the image capture device;
      iii) interpolating the representative low resolution image to producing a blurred high resolution image;
      iv) calculating an image difference map from the aggregate high resolution image and the blurred high resolution image; and
      v) using the image difference map along with the aggregate high resolution image and the high resolution image to produce an improved high resolution image.

2. The method of claim 1 wherein step b) further includes using an infinite impulse response filter to combine the low resolution images to provide an aggregate low resolution image.

3. The method of claim 1 wherein step b) further includes correcting for motion present between at least some of the low resolution images.

4. The method of claim 1 wherein step c)ii) further includes reducing the resolution of the high resolution image using substantially the same binning and decimation procedure used in the capture of the low resolution images.

5. The method of claim 1 wherein step c)v) includes:
   a) producing a blurred high resolution image by reducing the high resolution image to produce a reduced image and then interpolating the reduced image to produce the blurred high resolution;
   b) combining chrominance information from the aggregate high resolution image and chrominance information from the blurred high resolution image using the image difference map to form combined chrominance information;
   c) computing luminance information corresponding to the high resolution image; and
   d) using the combined chrominance information and the luminance information from the high resolution image to produce the improved high resolution image.

6. The method of claim 1 wherein step c)v) also includes:
   a) producing a blurred high resolution image;
   b) computing the difference between the aggregate high resolution image and the blurred high resolution image to form a residual image;
   c) reducing the noise in the high resolution image to produce a noise-reduced high resolution image; and
   d) using the residual image, the reduced-noise high resolution image and the image difference map to form an improved high resolution image.

* * * * *